United States Patent [19]

Spatafora et al.

[11] Patent Number: 5,199,546
[45] Date of Patent: Apr. 6, 1993

[54] DISTRIBUTING DEVICE FOR FEEDING FLAT PRODUCTS TO A USER MACHINE

[75] Inventors: Mario Spatafora; Antonio Gamberini, both of Bologna, Italy

[73] Assignee: G.D Societa' per Azioni, Bologna, Italy

[21] Appl. No.: 827,716

[22] Filed: Jan. 29, 1992

[30] Foreign Application Priority Data

Feb. 1, 1991 [IT] Italy ............................ B091A 000028

[51] Int. Cl.[5] ................................................. B65G 1/00
[52] U.S. Cl. ................................................. 198/347.3
[58] Field of Search ....................... 198/441, 447, 347.3

[56] References Cited

U.S. PATENT DOCUMENTS

| | | | |
|---|---|---|---|
| 2,630,903 | 3/1953 | Currivan | 198/441 |
| 2,770,349 | 11/1956 | Nordquist | 198/441 |
| 3,098,552 | 7/1963 | Schulz | 198/441 |
| 4,099,608 | 7/1978 | McCombie | 198/347.3 |

FOREIGN PATENT DOCUMENTS 861236  9/1981  U.S.S.R. .............................. 198/441

*Primary Examiner*—Joseph E. Valenza
*Attorney, Agent, or Firm*—Marshall, O'Toole, Gerstein, Murray & Bicknell

[57] ABSTRACT

A distributing device for feeding flat products, i.e. flat slab-shaped products, such as biscuits or lozenges, to a user machine having two input channels, each designed to receive a respective stream of products; the distributing device presenting a single input channel, and featuring two lobed wheels tangent to each other and to one end of the input channel; each lobe presenting a cavity cooperating with a pickup and release device for retaining, inside respective cavities, alternate products traveling along the feed channel, and releasing said products onto a respective conveyor by which they are fed to a respective input channel of the user machine.

10 Claims, 4 Drawing Sheets

DISTRIBUTING DEVICE FOR FEEDING FLAT PRODUCTS TO A USER MACHINE

BACKGROUND OF THE INVENTION

The present invention relates to a distributing device for feeding flat products to a user machine.

In particular, the present invention may be used to advantage in the food industry for feeding products, such as biscuits or lozenges, to a packing machine having two input channels, each receiving a respective stream of products off a production machine along a single feed channel.

For feeding each stream to the respective input channel, the feed channel is connected directly to both input channels by means of a branch comprising a distributing device, which normally consists of a two-position deflecting member for alternately directing the products traveling along the feed channel to one and then the other of the two input channels.

The above deflecting member involves a number of drawbacks, mainly due to the products, which travel at relatively high speed along the feed channel, being frequently damaged, and ultimately rejected, when intercepted by the deflecting member. Moreover, the deflecting member does not always succeed in feeding the products accurately inside the respective input channel, thus frequently resulting in jamming of the branch channel.

SUMMARY OF THE INVENTION

It is an object of the present invention to provide a distributing device designed to overcome the aforementioned drawbacks.

According to the present invention, there is provided a distributing device for feeding flat products to a user machine having two input channels; the distributor device comprising a single feed channel for a first stream of products; being designed to direct the products in said first stream alternately to said two input channels, for feeding each input channel with a respective second stream of products; and being characterised by the fact that it comprises two first transfer devices, and two conveyors, each series connected to a respective said transfer device between the feed channel and a respective said input channel, for feeding the input channel with a respective said second stream of products; pickup and release means being provided on each transfer device for picking up a product on a portion of the feed channel at a pickup station, and transferring the product on to the respective said conveyor at a release station.

According to a preferred embodiment of the above device, the two first transfer devices comprise two coplanar lobed wheels mounted for rotation about parallel shafts substantially perpendicular to and on opposite sides of the feed channel; each lobed wheel presenting a number of equally-spaced lobes, each having, on top, a cavity opening laterally outwards and constituting a seat for at least part of a respective said product.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
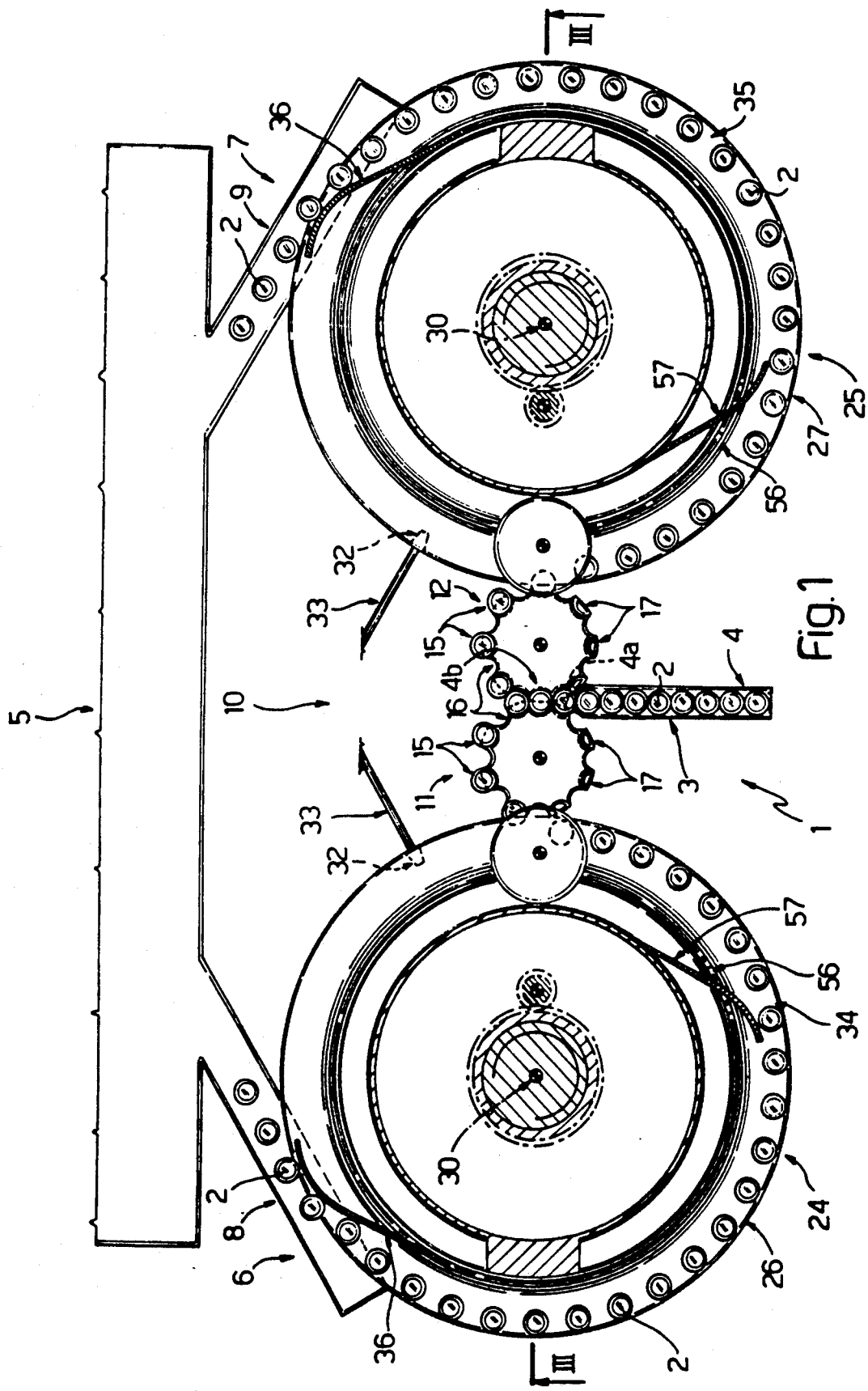
FIG. 1 shows a schematic partially-sectioned plan view, with parts removed for simplicity, of a preferred embodiment of a distributing device in accordance with the present invention.

Number 1 in FIG. 1 indicates a machine for producing flat cylindrical products, e.g. lozenges 2, which are fed successively off machine 1 in an orderly stream 3 along a conveyor belt 4 to a user machine 5 consisting, in the example shown, of a wrapping machine having two input channels 6 and 7 for receiving respective streams 8 and 9 of lozenges 2.

Figure 2:
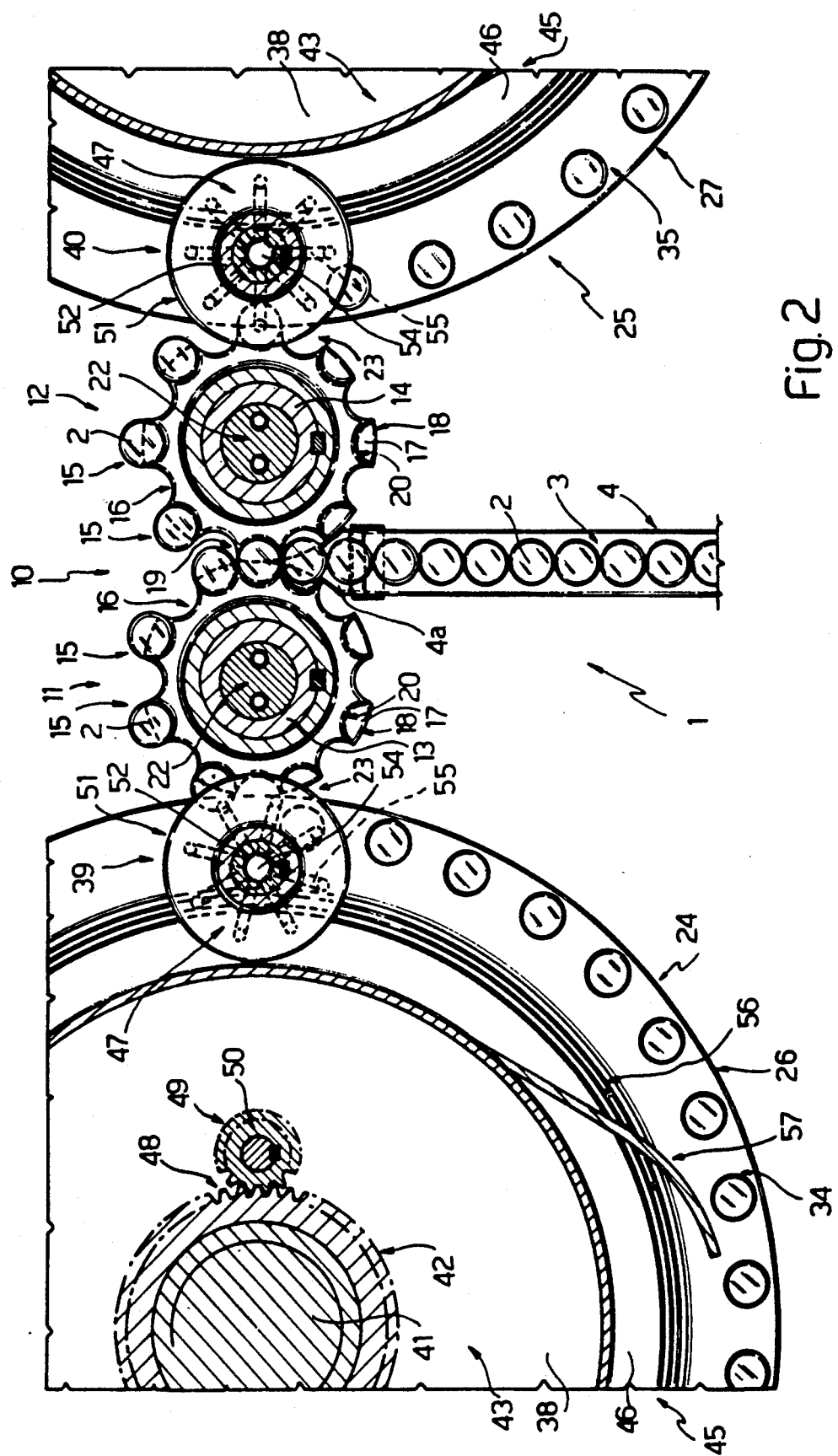
FIG. 2 shows a larger-scale view of a detail in FIG. 1.

Conveyor 4 is connected to input channels 6 and 7 of machine 5 by a distributing device indicated as a whole by 10 and comprising two transfer devices consisting of two substantially tangent lobed wheels 11 and 12 fitted on respective shafts 13 and 14 (FIG. 2) perpendicular to the FIG. 2 plane and turning respectively anticlockwise and clockwise in FIG. 2.

Shafts 13 and 14, one of which is powered, are located on opposite sides of a flat plate tangent to the output end of the top branch of conveyor 4, and constituting the input channel 4a of distributing device 10. Wheels 11 and 12 are supported on respective shafts 13 and 14 so that they are substantially tangent to each other along the longitudinal axis of channel 4a, and lie in the same plane parallel to the FIG. 1 plane and to the flat upper conveying surface of channel 4a. Viewed from above, channel 4a is substantially triangular, with opposite sides extending along the edge of wheels 11 and 12, and the tip inside a station 4b where lozenges 2 are picked up by wheels 11 and 12.

Each of wheels 11 and 12 presents a number of equally-spaced peripheral lobes 15, all inscribed in a common cylindrical surface substantially tangent to the corresponding cylindrical surface of the other wheel, and each separated from the adjacent lobe 15 by a radial recess 16.

On top, each lobe 15 presents a cavity opening both upwards and laterally outwards, and defining a seat 17 for at least part of a respective lozenge 2.

As shown in FIG. 2, each seat 17 presents a flat bottom surface 18 coplanar with the upper surface of channel 4a; and wheels 11 and 12 are angularly offset so that each seat 17 moves through pickup station 4b together with a corresponding recess 16 on the other wheel. Each seat 17 and the corresponding recess 16 on the other wheel are so formed as to define, when facing each other in pickup station 4b, a compartment 19 for relatively accurately receiving a respective lozenge 2.

Figure 3:
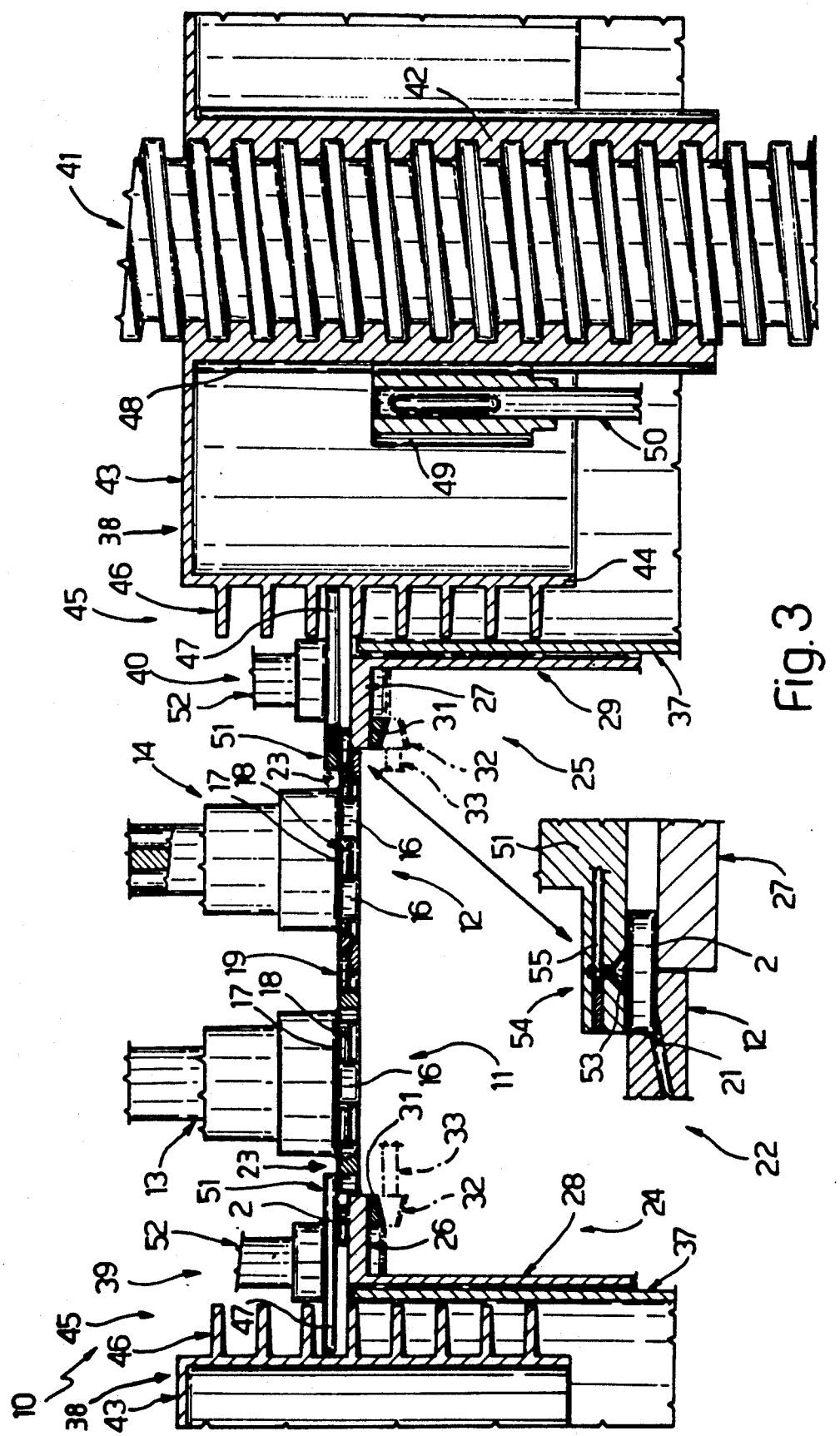
FIG. 3 shows a section along line III—III in FIG. 1.

As shown in FIG. 3, when measured in the direction of the shaft of respective wheel 11, 12, the depth of each seat 17 is at most equal to that of lozenge 2.

In addition to bottom surface 18, each seat 17 is also defined by a curved lateral surface 20 extending upwards from surface 18, with its concave side facing radially outwards of wheel 11, 12. On the edge between surfaces 18 and 20, each seat 17 presents a hole 21 connecting seat 17 to a pneumatic device 22 for picking up and releasing lozenges 2. In addition to holes 21, device 22 comprises a number of known distributors (not shown), and a number of conduits (not shown) formed through wheels 11 and 12 and respective shafts 13 and 14, for connecting holes 21 to a suction and pressure pump (not shown).

Figure 4:
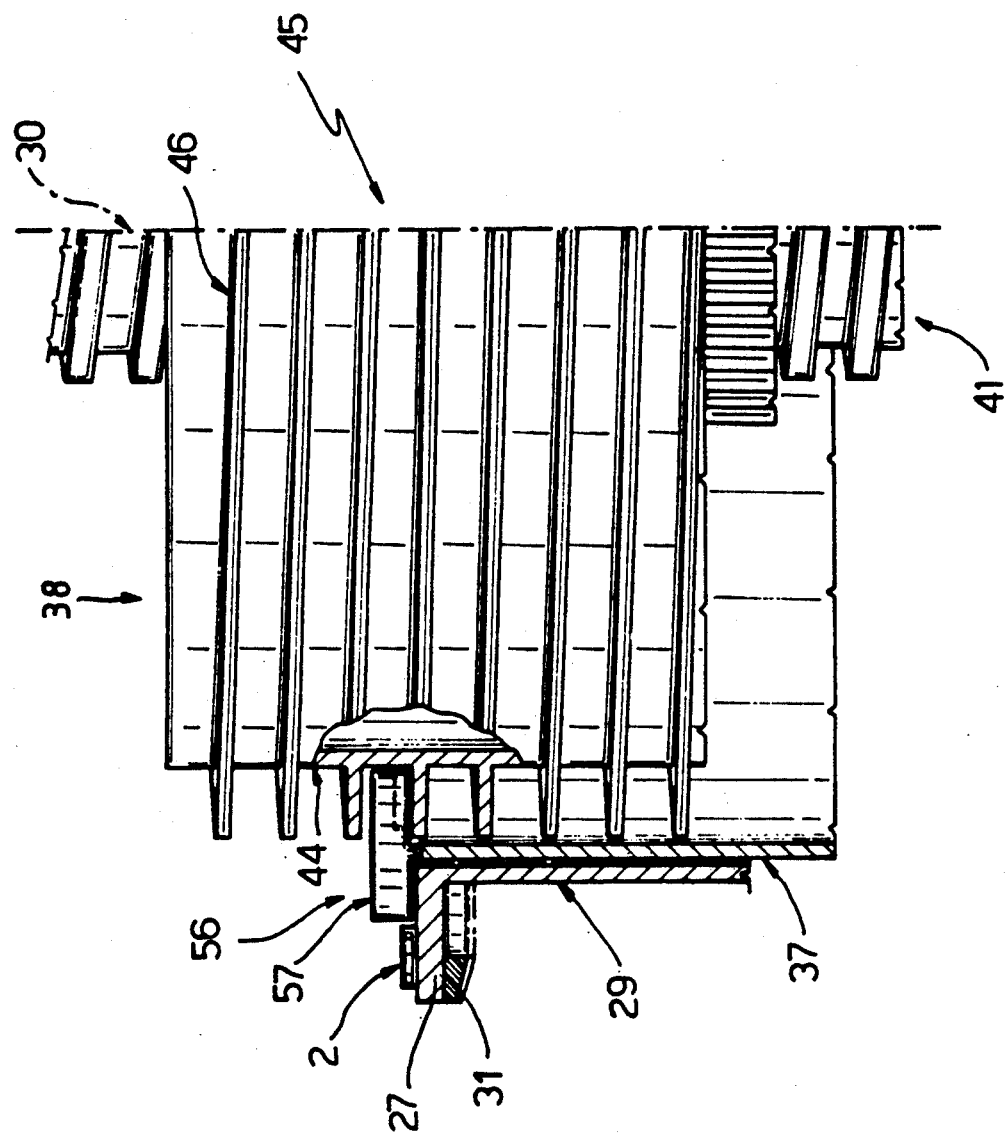
FIG. 4 shows a larger-scale view of a detail in FIG. 3.

At respective release stations 23 diametrically opposite each other in relation to pickup station 4b, wheels 11 and 12 are connected to respective conveyors 24 and 25 tangent to the outer edge of wheels 11 and 12. As shown, particularly in FIG. 3, conveyors 24 and 25 are defined respectively by two upper annular flanges 26 and 27 of two cylindrical drums 28 and 29 mounted for rotation about respective axes 30 (only one of which is shown in FIGS. 1 and 4) parallel to the axes of shafts 13 and 14. Flanges 26 and 27 present upper surfaces coplanar to each other and to bottom surfaces 18 of seats 17, and, along the bottom surface, present respective bevel ring gears 31 meshing with respective bevel pinions 32 fitted to respective drive shafts 33 for rotating drums 28 and 29 and respective flanges 26 and 27 about respective axes 30 at a surface speed at least equal to that of seats 17, and in the opposite direction to respective wheels 11 and 12.

As shown in FIG. 1, conveyors 24 and 25 extend over respective input portions of respective channels 6 and 7.

In actual use, wheels 11 and 12 are rotated at constant speed, so that compartments 19 defined between wheels 11 and 12 over channel 4a travel along channel 4a and through pickup station 4b at substantially constant speed, and at the same speed at which lozenges 2 travel along conveyor 4. Consequently, on reaching channel 4a, the leading lozenge 2 in stream 3 (hereinafter referred to as 2a) is gradually enclosed inside a respective compartment 19, the bottom surface of which is defined partly by bottom surface 18 of seat 17, and partly by the upper surface of channel 4a, which gets gradually narrower as compartment 19 nears pickup station 4b, downstream from which, lozenge 2a is supported solely by bottom surface 18 of seat 17.

Immediately upstream from pickup station 4b, a vacuum is formed in known manner inside hole 21 in seat 17 by the pump (not shown) connected to hole 21, so as to grip lozenge 2a against lateral surface 20, and so prevent it from slipping out of seat 17 downstream from pickup station 4b and on leaving channel 4a. Each wheel 11 and 12 thus feeds lozenges 2 inside respective seats 17 over an arc of roughly 180° to respective release station 23, where device 22 is inverted to replace the vacuum inside hole 21 with a jet of compressed air, which, combined with the centrifugal forces acting on lozenge 2, forces this radially outwards of seat 17 on to respective conveyor 24, 25. The lozenges 2 picked up alternately from stream 3 by wheels 11 and 12 are thus formed into respective streams 34 and 35 on conveyors 24 and 25, and fed towards respective channels 6 and 7, into which each is directed by a respective fixed deflecting member 36 on a respective cylindrical drum 37 fixed coaxially inside respective drum 28, 29.

As shown, particularly in FIG. 3, distributing device 10 also comprises two compensating stores 38, each coaxial with respective drum 37 and connected to respective wheel 11, 12 by a respective second transfer device 39, 40. As shown in FIG. 3, each store 38 comprises a fixed screw 41 coaxial with axis 30 and extending through drum 37; and a nut screw 42 connected to screw 41. The top end of nut screw 42 presents an outer flange 43, the outer edge of which is fitted with a cylindrical drum 44 covering nut screw 42 and fitted on its outer Surface with a substantially radial band 45. Band 45 is wound about drum 44 in the form of a cylindrical spiral sloping the same way as screw 41, and the pitch of which is substantially equal to that of screw 41 but greater than the thickness of lozenges 2.

Spiral 46 of each band 45 intersects the plane of bottom surface 18 of seats 17 at a loading station 47 located substantially in the plane defined by axes 30 and coplanar to pickup and release stations 4b and 23.

Nut screw 42 presents external teeth 48 meshing in axially-sliding manner with a gear 49 fitted to a drive shaft 50 having its axis parallel to axes 30.

Each transfer device 39 and 40 comprises a cylindrical wheel 51 fitted to a shaft 52, the axis of which is coplanar with the axes of shafts 13 and 14 and with axes 30.

Each cylindrical wheel 51 is located over the plane of bottom surface 18 of seats 17 and the upper surfaces of flanges 26 and 27, with a clearance at least equal to the thickness of lozenges 2. At the bottom, each wheel 51 presents a number of substantially conical cavities 53, each forming the end portion of a lozenge pickup device 54. As shown in FIG. 3, device 54 comprises a suction conduit 55 connecting cavity 53 in known manner (not shown) to a suction device (not shown) for producing a vacuum in conduit 55 as cavity 53 travels over a given arc, roughly 180° in the example shown, between release station 23 and loading station 47, where the outer edge of wheel 52 is positioned between two adjacent turns of spiral 46 of band 45.

In particular, cavities 53 of each wheel 51 are arranged along a circumference tangent to both a cylindrical surface along the axes of lozenges 2 on wheels 11 and 12, and to the cylindrical surface defined by the longitudinal axis of band 45 of respective store 38.

In actual use, under normal operating conditions of both machines 1 and 5, devices 54 and wheels 51 remain idle; and lozenges 2 are transferred from channel 4a to channels 6 and 7 by conveyors 24 and 25 rotated by respective shafts 33.

Conversely, if, for example, either one of channels 6 and 7 is unable to receive lozenges 2, respective wheel 11, 12 picks up lozenges 2 at pickup station 4b, and transfers them successively to release station 23 where, after eliminating the suction produced by device 22 and activating pickup device 54, they are picked up immediately by wheel 51 and fed on to band 45 in loading station 47. At the same time, shaft 50 is activated to rotate drum 44 (counterclockwise for store 38 to the left, and clockwise for store 38 to the right in FIG. 1) and so operate band 45 as to feed lozenges 2 downwards into drum 37.

In the event of machine 1 being arrested, shafts 50 are activated to rotate respective drums 44 (counterclockwise for store 38 to the right, and clockwise for store 38 to the left in FIG. 1) and so operate bands 45 as to feed the previously stored lozenges 2 upwards to respective loading stations 47. Downstream from loading stations 47, lozenges 2 are raised slightly on to respective flange 26, 27 before being intercepted, in respective unloading stations 56, by respective deflecting members 57 supported on drums 37 and designed to transfer lozenges 2 on to respective conveyors 24 and 25.

We claim:

1. A distributing device (10) for feeding flat products (2) to a user machine (5) having two input channels (6, 7);

the distributing device (10) comprising a single feed channel (4a) for a first stream (3) of products (20 being designed to direct the products (2) in said first stream (3) alternately to said two input channels (6, 7), for feeding each input channel (6, 7) with a respective second stream (8, 9) of products (2);

two first transfer devices (11, 12), and two conveyors (24, 25) with each conveyor being connected to a respective first transfer device between the feed channel (4a) and a respective input channel (6, 7) for feeding the input channel (6, 7) with a respective second stream (8, 9) of products (2);

pickup and release means (22) being provided on each first transfer device (11, 12) for picking up a product (2) on a portion of the feed channel (4a) at a pickup station (4b), and transferring the product (2) onto the respective conveyor (24, 25) at a release station (23);

two compensating stores (38) assigned respectively to said two first transfer devices; and a second transfer device (39, 40) located between each first transfer device (11, 12) and the respective said store (38).

2. A device as claimed in claim 1, characterised by the fact that said two first transfer devices comprise two coplanar lobed wheels (11, 12) mounted for rotation about parallel shafts (13, 14) substantially perpendicular to and on opposite sides of said feed channel (4a); each lobed wheel (11, 12) presenting a number of equally-spaced lobes (15), each having, on top, a cavity opening laterally outwards and forming a seat (17) for at least part of a respective said product (2).

3. A device as claimed in claim 2, characterised by the fact that each said seat (17) presents a flat bottom surface (18) coplanar with the feed channel (4a); each said lobe (15) being separated from each adjacent lobe (15) by a recess (16); said two lobed wheels (11, 12) being angularly offset, so that, in use, each said seat (17) moves through the pickup station (4b) together with a corresponding recess (16) on the other wheel (11, 12); and each said seat (17) and corresponding recess (16) being so formed as to define, when facing each other in said pickup station (4b), a compartment (19) designed to receive a respective said product (2).

4. A device as claimed in claim 2, characterised by the fact that the depth of each said seat (17), measured in the direction of the shaft (13, 14) of the respective said wheel (11, 12), is at most equal to the thickness of said product (2).

5. A device as claimed in claim 1, characterised by the fact that a first fixed deflecting member (36) is provided for each conveyor (24, 25), for intercepting and directing the products (2) on the conveyor (24, 25) to a respective said input channel (6, 7).

6. A device as claimed in claim 2, characterised by the fact that each said conveyor (24, 25) is a rotary conveyor assigned to a respective said wheel (11, 12) and turning about an axis (30) parallel to the rotation axis of the respective said wheel (11, 12).

7. A device as claimed in claim 6, characterised by the fact that each said conveyor (24, 25) comprises a cylindrical drum (28, 29) coaxial with the rotation axis (30) of the conveyor (24, 25); and an annular flange (26, 27) extending radially outwards from said drum (28, 29), and the upper surface of which is coplanar with the bottom surface (18) of said seats (17).

8. A device as claimed in claim 1, characterised by the fact that each said store (38) is assigned to a respective said conveyor (24, 25), and comprises a fixed screw (41) coaxial with the respective conveyor (24, 25); a powered nut screw (42) connected to said screw (41); a cylindrical drum (44) coaxial and integral with the nut screw (42); and a band (45) supporting said products (2) and extending substantially radially from said drum (44); said band (45) winding about said drum (44) in the form of a cylindrical spiral (46) sloping the same way and having substantially the same pitch as said screw (41).

9. A device as claimed in claim 1, characterised by the fact that each second transfer device comprises a cylindrical wheel (51) located over the respective first transfer device and respective conveyor (24, 25), with a clearance at least equal to the thickness of said product (2); and vacuum means (54) located on each said cylindrical wheel (51) and positioned facing the respective first transfer device and respective conveyor (24, 25), for successively withdrawing said products (2) from said first transfer device and transferring them into the respective store (38).

10. A device as claimed in claim 1, characterised by the fact that a second fixed deflecting member (57) is provided for each said store (38), for intercepting the products (2) in said store (38) and directing them on to the respective conveyor (24, 25).

* * * * *